(12) United States Patent
Torrubia-Saez

(10) Patent No.: US 6,591,415 B1
(45) Date of Patent: Jul. 8, 2003

(54) POLYMORPHIC CODE GENERATION METHOD AND SYSTEM THEREFOR

(75) Inventor: Andres Torrubia-Saez, Alicante (ES)

(73) Assignee: Trymedia Systems, San Francisco, CA (US)

( * ) Notice: Subject to any disclaimer, the term of this patent is extended or adjusted under 35 U.S.C. 154(b) by 0 days.

(21) Appl. No.: 09/558,096

(22) Filed: Apr. 25, 2000

Related U.S. Application Data

(63) Continuation-in-part of application No. 09/328,737, filed on Jun. 9, 1999.
(60) Provisional application No. 60/131,769, filed on Apr. 30, 1999.

(51) Int. Cl.$^7$ ................................................ G06F 9/45
(52) U.S. Cl. ........................ 717/159; 717/158; 717/168; 717/172
(58) Field of Search ......................... 717/159; 713/200, 713/176

(56) References Cited

U.S. PATENT DOCUMENTS 5,559,884 A * 9/1996 Davidson et al. ............ 705/58
6,006,328 A * 12/1999 Drake ........................ 713/188
6,067,639 A * 5/2000 Rodrigues et al. ............ 714/38

* cited by examiner

*Primary Examiner*—Gregory Morse
*Assistant Examiner*—Kenneth A Gross
(74) *Attorney, Agent, or Firm*—Glenn Patent Group; Michael A. Glenn; Kirk D. Wong

(57) ABSTRACT

A method and system for producing multiple copies of an executable software object, in which a copy is functionally identical to all other copies while being structurally unique, alter the source code according to parameters specified by a seed and a set of preferences. High-level source code is translated to assembly code. Selected procedures from the assembly code are blended to form larger procedures functionally equivalent to the original procedures. Instructions within procedures are reshuffled, while the original flow of execution is conserved. Dummy opcodes are interspersed with executable instructions. The resulting modified code is translated to object code and an executable object is constructed. The invention is also embodied as a computer readable program product on a computer readable medium. Each copy bears a unique fingerprint that allows the producer of the product to exercise control over the use of the software product and prevent unauthorized use and copying.

42 Claims, 4 Drawing Sheets

POLYMORPHIC CODE GENERATION METHOD AND SYSTEM THEREFOR

CROSS REFERENCE TO RELATED APPLICATIONS

This application is a Continuation-in-part of pending U.S. application Ser. No. 09/328,737 filed Jun. 9, 1999, which claims benefit of U.S. Provisional Application No. 60/131,769, filed Apr. 30, 1999.

BACKGROUND OF THE INVENTION

1. Field of the Invention

The invention relates to the design of software products and the production of copies thereof for commercial distribution. More particularly, the invention relates to methods and systems for producing multiple copies of a software product wherein a copy of the software product is functionally identical to all other copies while being structurally unique.

2. Description of Prior Art

The co-pending U.S. patent application Ser. No. 09/328,737, "Methods and Apparatus for Secure Distribution of Software," A. Torrubia-Saez, Jun. 9, 1999 discloses various methods of producing and commercially distributing access-controlled software packages via data transmission. Such access-controlled packages prevent a user from making full use of a downloaded software product until a purchase transaction has been completed. Further disclosed are methods of watermarking executable objects and data objects to prevent unauthorized use or copying. However, methods and systems for producing different copies of a software application in which each copy is functionally identical and structurally unique are not described.

FIG. 1 provides a flowchart of a conventional process for designing and producing software products. During the design phase, programmers or software engineers typically write the software application in a high-level programming language such as C or C++. At this stage of production, the application generally consists of several modules, each written in the programming language of choice. A compiler 10 then translates the high-level code to assembly code. Subsequently, an assembler 11 translates the assembly code to object code, machine-readable code consisting entirely of binary instructions. A linker 12 takes the separate modules of object code and combines them with required routines from external libraries to produce an executable program 13. Multiple identical copies 14 are made of this executable file and distributed. Typically, when a user installs the application to their computer, they must supply a serial number or an authorization code in order for the setup program to complete the installation.

R. Davidson and N. Myhrvold, "Method and System for Generating and Auditing a Signature for a Computer Program," U.S. Pat. No. 5,559,884, Sep. 24, 1996, provide a means of uniquely identifying an authorized version of an executable module. Davison, et al. teach selecting several portions of executable code, and reordering and modifying the executable code portions in a manner that preserves the original flow of execution. The new placement order of the code sections forms a signature for the version that is difficult to detect or remove. S. Moskowitz and M. Cooperman, "Method for Stega-Cipher Protection of Computer Code," U.S. Pat. No. 5,745,569 (Apr. 28, 1998) provide a method for protecting computer code copyrights by encoding a digital watermark into essential portions of code resources. Encoding the code portions into a data resource further conceals the watermark. The watermark may not be removed without destroying the functionality of the software application.

In either of the disclosed prior art methods, the typical end user would indeed have difficulty detecting and removing the security mechanisms without damaging the executable code. However, the modifications to the executable code are simple enough that a skilled cracker or pirate could detect and eliminate at least a portion of the signature or watermark without disrupting the normal flow of execution by disassembling or reverse compiling the executable code and examining the resulting source code. Several people, each having a version of the program and comparing copies, could accomplish the task even more easily. Furthermore, because each version of the software is identical, the method of the Moskowitz, et al. teachings is vulnerable to circumvention by patching. If a program has security logic built in to prevent unauthorized copying or use, a cracker can remove the security from a copy by creating a small patch program that patches byte locations to remove security checks. For example if a program has the code:

0X123001: call checksecurity
0X123008: test ax,ax
0X123009: je badguy A cracker would merely have to patch 0X123009 with two NOP operands to override the security protection. Since all copies of the program are the same, patching location 0X123009 would disable security in all copies of the program.

Thus, as a means of uniquely identifying and controlling every copy of a computer program, it would be desirable to provide a way of producing copies of the program in which a copy is functionally identical to all other copies and structurally unique, so that each copy actually constitutes a separate version of the program. It would be desirable to produce these structurally unique copies by selecting portions of the source code to the application at random and merging individual procedures into larger procedures. It would be desirable to further modify the source code by reordering instructions in a manner that conserves the normal flow of execution. It would be desirable to make the code modifications extremely difficult to detect and render the program invulnerable to reverse engineering by modifying the source code still further with insertion of randomly selected dummy opcodes between the instructions, so that the executable code could not be reverse-compiled or disassembled.

SUMMARY OF THE INVENTION

The invention provides a method and a system for producing different versions of a software application wherein each version is functionally identical to all other versions and structurally unique. The intended utility for the invention is as a security measure in a system for secure distribution of software to provide a unique fingerprint for each copy of a software application distributed in response to a purchase request. The invention has the further utility of preventing unauthorized use and copying. The invention also incorporates measures for guarding the software application against reverse-engineering.

The invention, embodied herein as a system and a method, operates on the assembly code to a software application. The method of the invention is a pseudo-random procedure driven by a seed and a set of preferences. Various modifications are made to selected instruction sequences in the assembly code, the selection of the instruction sequences being pseudo-random. In a first step, multiple procedures within an instruction sequence are blended, or merged, so that a single, larger procedure is formed that is functionally equivalent to the original procedures. In a second step, the instructions within an instruction sequence are shuffled, or reordered, in a manner that conserves the original order of execution. In a third step, dummy opcodes are inserted between instructions in an instruction sequence, preceded by a branching instruction from one instruction to the next one following it in the sequence. The steps of the invented method may be executed in any order, or they may be performed simultaneously. It is unnecessary that all steps of the invented method be applied to all selected instruction sequences. The insertion of sufficiently large dummy opcodes provides a measure of protection against reverse-engineering because they will confuse a disassembly program and cause it to disassemble the executable code incorrectly.

DETAILED DESCRIPTION

For purposes of the current description, the term "source code" or "source" may refer either to high-level code or assembly code. "Source files" refer to files comprising either high-level code or assembly code. The invention is particularly well-suited for application in the secure methods of distributing software and data objects described in the co-pending U.S. patent application Ser. No. 09/328,737, "Methods and Apparatus for Secure Distribution of Software," A. Torrubia-Saez, Jun. 9, 1999.

Figure 2:
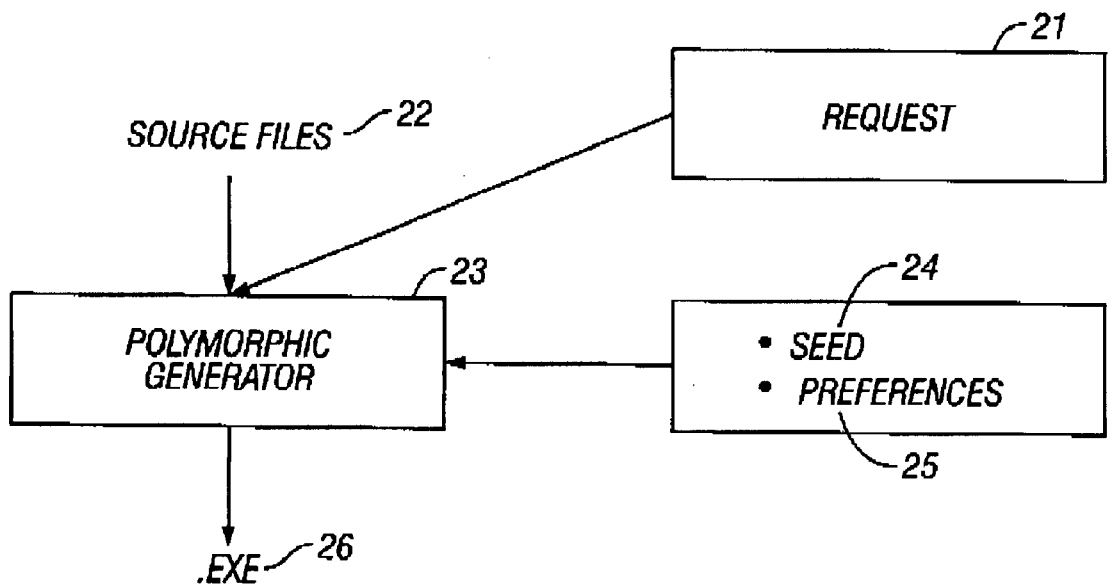
FIG. 2 provides a flow chart of a method of producing software applications wherein a version of the software application is functionally identical to all other copies while being structurally unique, according to the invention.

Referring now to FIG. 2, an overview of a process for producing copies of an executable software product is shown, in which a copy of the software product is functionally identical to all other copies while being structurally unique. A request 21 is directed to a polymorphic generator 23. The request may originate from a purchaser or a prospective purchaser of the software product, or it may also originate with an operator involved in the design and commercial production of the software product. Source files 22 are supplied to the polymorphic generator. In the case of high-level source files, an external translator translates them to assembly code (not shown). Along with the source files, a seed 24 and a set of preferences 25 are supplied to the polymorphic generator 23. The seed 24 initializes a multi-step procedure, described further below, in which the polymorphic generator modifies the source code 22 according to parameters specified by the seed 24 and the preferences 25, such that the normal execution flow of the program is conserved. The resulting modified code is translated and packaged and an executable software object 26 is produced. It is to be understood that the seed is unique and therefore the particular executable 26 produced incorporates code modifications that render it structurally unique while being functionally identical to any other copy of the same software product, so that each copy constitutes a separate version of the software product. Methods of generating unique seeds to initialize random processes are commonly known to those skilled in the art of computer programming. In certain embodiments of the invention, a default set of preferences is provided. In other embodiments of the invention, a unique set of preferences is generated for each version of the software product produced.

Figure 1:
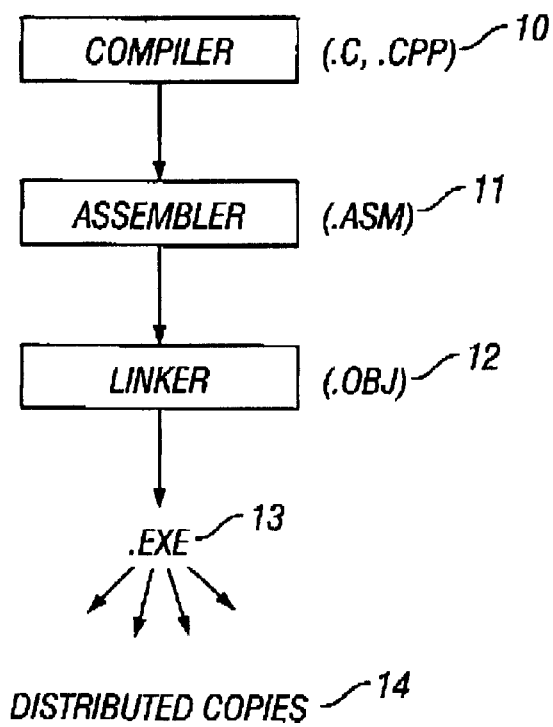
FIG. 1 provides a flow chart of a conventional method of designing and distributing software applications.

The polymorphic generator 23 may be a computer programmed to carry out the process of FIG. 1 or it may be a software module that is operative to carry out the process of FIG. 1. In the case of a software module, the polymorphic generator may comprise a standalone executable program or it may be a functional unit, such as a procedure or function within an executable program. Other embodiments consistent with the scope of the invention will be apparent to those skilled in the art of computer programming.

As described above, the request 21 may originate from a purchaser or prospective purchaser. The parent application to the current application, Ser. No. 09/328,737, supra, describes various methods of distributing software packages commercially in the online environment. Thus the request may be directed to the polymorphic code generator 23 via a data connection to an online service, for example; or it may be delivered over a network, the Internet, for example. The executable software object 26 may also be distributed on various forms of computer readable media, diskettes or compact discs, for example.

Figure 3:
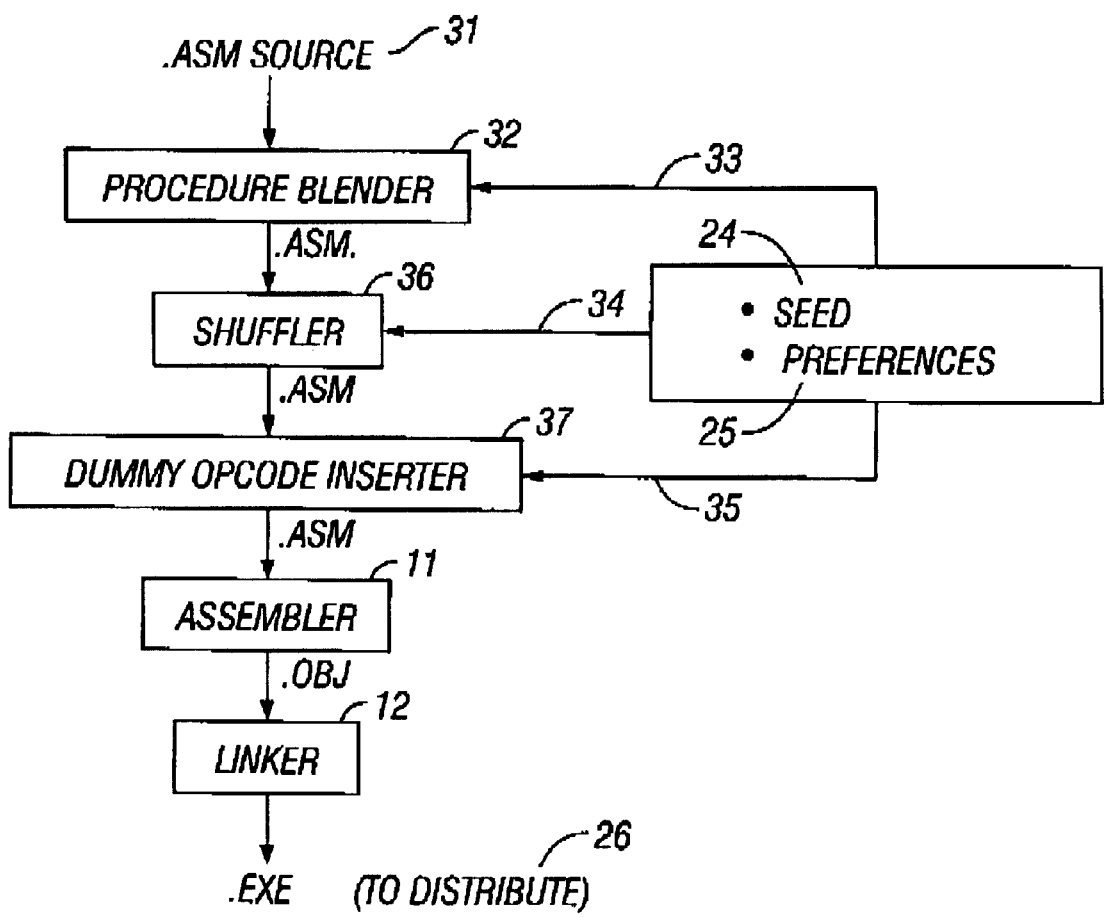
FIG. 3 shows a block diagram of a polymorphic code generator, according to the invention.

Turning now to FIG. 3, a detailed block diagram of the polymorphic code generator is shown. The modifications performed by the polymorphic code generator are to assembly code; therefore assembly source 31 is specified in the Figure. However, in the case of high-level code, an external translator translates the high-level code to assembly code (not shown). The polymorphic code generator incorporates three unique components: a procedure blender 32, a shuffler 36, and a dummy opcode inserter 37. Each of the components of the polymorphic generator may be embodied as hardware programmed to perform the specified function or as software modules operative to perform the specified function. Parameters for the processes carried out by the procedure blender, the shuffler, and the dummy opcode inserter, are specified according to the seed 24, and the preferences 25, indicated by arrows 33, 34, and 35. The procedure blender, according to instructions supplied by the seed and the preferences, selects procedures within the assembly code, and blends, or merges, the selected procedures into a single procedure that is functionally equivalent to the original selected procedures. The function of the procedure blender will be described in detail further below. The shuffler 36 identifies one or more procedures within the assembly code and reorders, or shuffles, the instructions within the procedure, such that the order of execution is conserved. The function of the shuffler is described in detail below. The dummy opcode inserter 37 inserts a branch from a first instruction to a next instruction, and then inserts dummy data between the branch and the next instruction. The function of the dummy opcode inserter is described in detail further below.

The three components previously described may also be embodied as steps of a method. While the invention has been described in a particular order, in actual fact, the order of the components is unimportant. Thus, the code may first be shuffled, or the dummy data inserted prior to any other operation. After the source code is modified as previously described, the modified code is translated to object code by the assembler 11 and an executable is constructed by the linker 12 from the object code.

Figure 4:
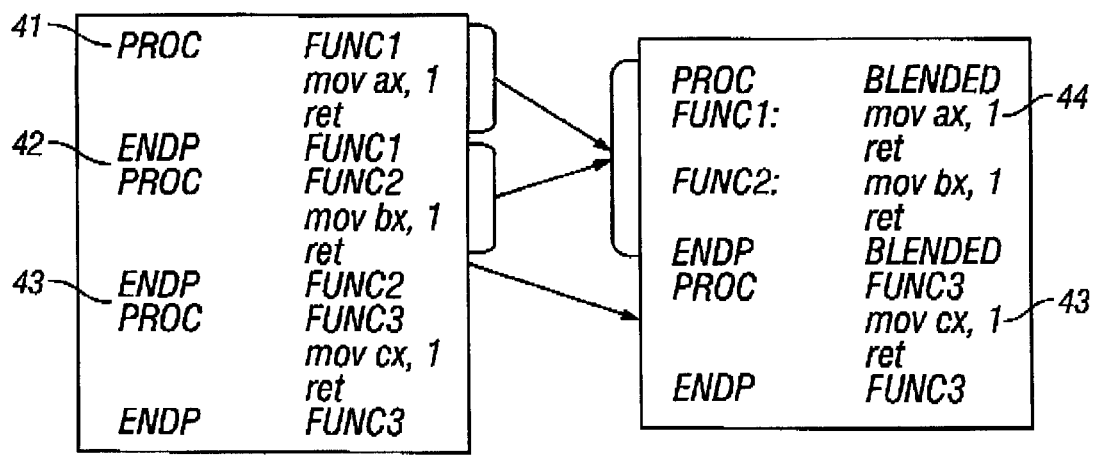
FIG. 4 provides a diagram of an instruction sequence before and after it is processed through the procedure blender of FIG. 3, according to the invention.

Referring now to FIG. 4, the operation of the procedure blender is illustrated in greater detail. FIG. 4 shows an instruction sequence before and after it has been modified by the procedure blender. The original instruction sequence contains the procedures FUNC1 (41), FUNC2 (42), and FUNC3 (43). In the modified instruction sequence, FUNC1 and FUNC2 have been combined into a single procedure, BLENDED (44), identical in function to the two original procedures. FUNC3 has been left unmodified. The selection of procedures to be blended is driven by the seed and the preferences.

Figure 5:
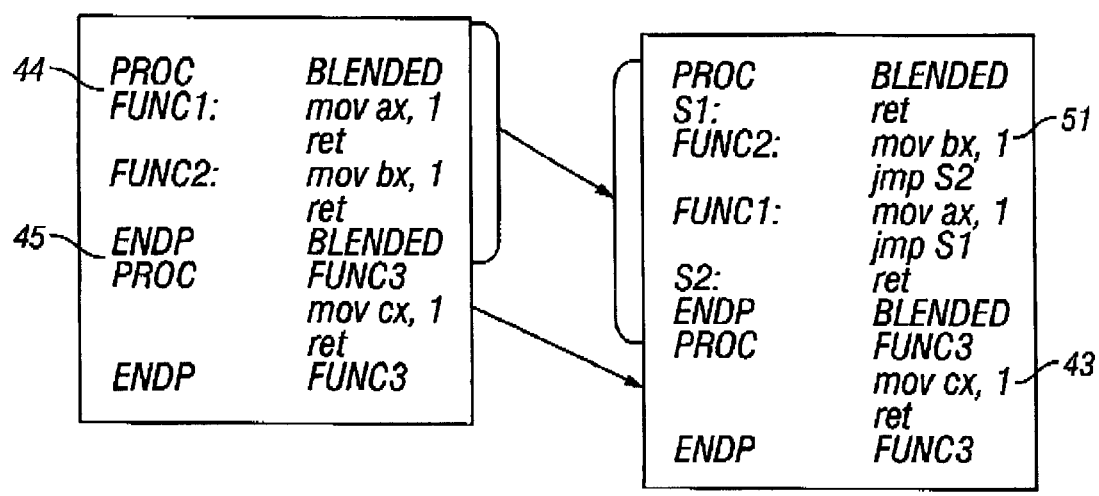
FIG. 5 provides a diagram of the blended instruction sequence of FIG. 4 before and after it is processed through the shuffler of FIG. 3, according to the invention.

FIG. 5 shows the operation of the shuffler 36 in detail. The starting instruction sequence contains the procedure BLENDED (44), as described above and FUNC3 (43). The modified instruction sequence shows BLENDED with the instructions reordered 51. The shuffler reorders instructions according to a disorder criterion specified by the seed. The procedure or procedures to be shuffled are specified by the preferences. In addition to reordering the instructions, the shuffler inserts branches in the code so that the original order of execution is conserved. Thus, in BLENDED, the order of FUNC1 and FUNC2 is reversed and the instructions are reordered; however the instructions are still executed in the proper order, in spite of the rearranging, because of the branching instructions that redirect the flow of execution to what was originally the next instruction. FUNC3 has been left unmodified. In the example, the blended procedure 63 that was originally formed from the procedures FUNC1 (41) and FUNC2 (42) has been shuffled. The invention does not require that a procedure first be blended before it can be shuffled. The steps may be applied to the source code file in any order, with the particular order being specified by the seed and the preferences.

Figure 6:
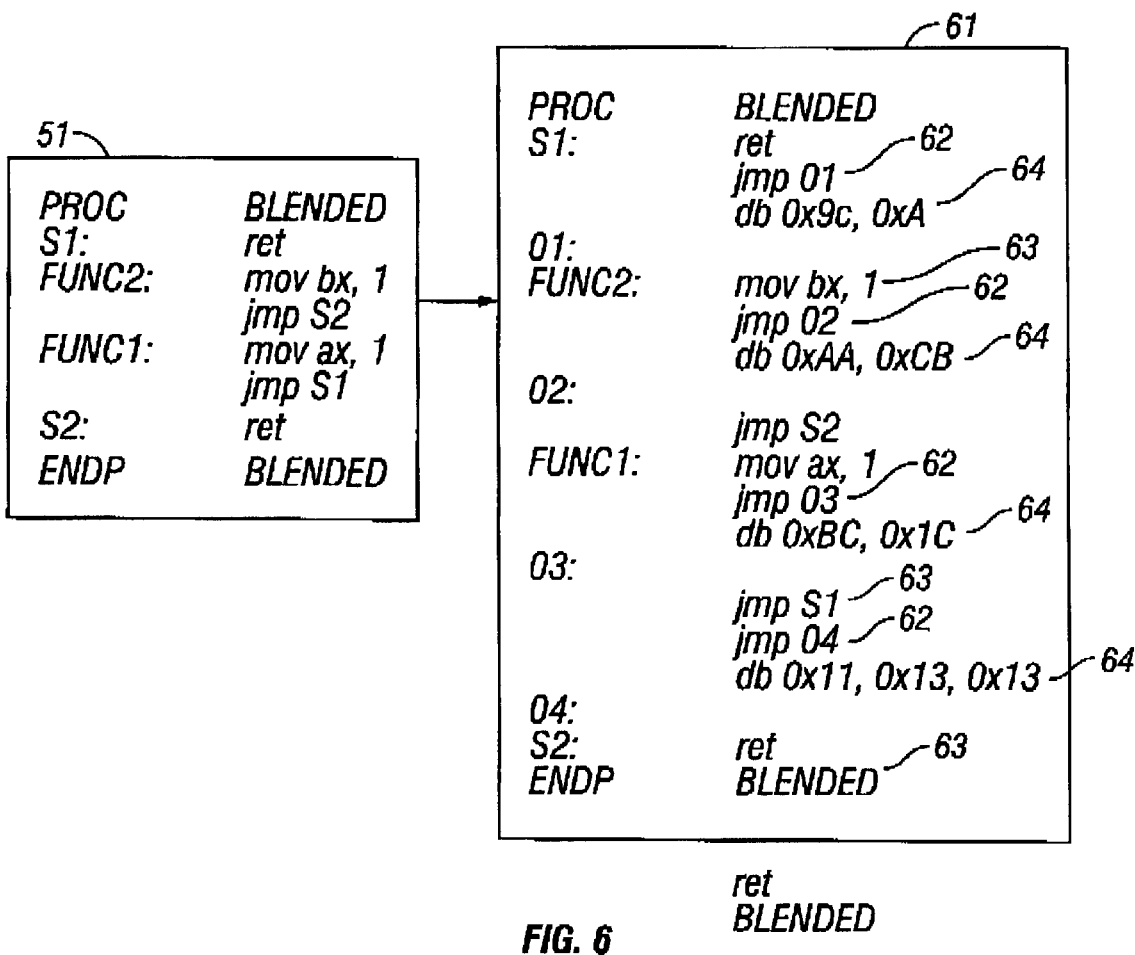
FIG. 6 shows a diagram of the shuffled instruction sequence of FIG. 5 before and after it is processed through the dummy opcode inserter of FIG. 3.

The insertion of dummy opcodes further modifies the source code in a manner that allows the normal flow of execution to be conserved, while making the modifications extremely difficult to detect. The operation of the dummy opcode inserter 37 is shown in detail in FIG. 6. The starting instruction sequence includes only the blended, shuffled procedure BLENDED 51. After every instruction in the procedure BLENDED, the dummy opcode inserter, with a probability indicated in the preferences, inserts a branch 62 to the next instruction 63. After the branch insertion, dummy data 64 is inserted between the branch and the next instruction. Thus, in the resulting instruction sequence 61, because the inserted branches cause the program flow to skip over the inserted dummy opcodes, the correct execution flow is conserved.

In certain embodiments of the invention, the opcodes to be inserted are generated by a pseudo random number generator initialized by the seed, as illustrated below:

mov ax,bx
jump XX1
DB RND[1]
XX1:
mov,ax,cx
jump,XX2
DB RND[2]
XX2:
mov ax,dx
jump XX3
DB RND[3]
XX3:

where RND[x] represents a pseudo-random number initialized with the seed. It is preferable that larger numbers be employed as dummy opcodes because they provide a measure of protection against reverse engineering. In the event that a cracker tried to disassemble the executable code of a software version produced according to the invention, the disassembler would attempt to disassemble the dummy opcodes and the instruction following the dummy opcode would be incorrectly disassembled, as a result. In other embodiments, the dummy opcodes are selected from a lookup table (LUT) on a pseudo random basis, as illustrated below. Table 1 represents a LUT of 17 predefined dummy opcodes.

TABLE 1

| | |
|---|---|
| DUMMY[0] | db 0ebh,3,0cdh,20h,17h;jmp eip+3 |
| DUMMY[1] | db 0ebh,2,0cdh,20h,0ebh,2,0cdh;20h;jmp eip+2,jmp eip+2 |
| DUMMY[2] | db 0ebh,2,0c7h,5,0ebh,2,0cdh,20h |
| DUMMY[3] | db 0ebh,2,0cdh,20h |
| DUMMY[4] | db 0ebh,2,0c7h,85h |
| DUMMY[5] | db 0ebh,3,0cdh,20h,0c7h |
| DUMMY[6] | db 0ebh,3,0cdh,20h,0eah |
| DUMMY[7] | db 0ebh,3,0cdh,20h,069h |
| DUMMY[8] | db 0ebh,2,069h,0b1h |
| DUMMY[9] | db 0ebh,2,0ebh,1,0ebh,1,0ebh |
| DUMMY[10] | db 0ebh,3,0cdh,20h,0ebh,0ebh,1,0ebh |
| DUMMY[11] | db 0ebh,1,0ebh,0ebh,2,0cdh,20h |
| DUMMY[12] | db 0ebh,3,0cdh,20h,0ebh |
| DUMMY[13] | db 0ebh,3,0cdh,20h,3 |
| DUMMY[14] | db 0ebh,4,0cdh,20h,2,2,0ebh,2,0cdh,20h |
| DUMMY[15] | db 0ebh,4,0cdh,20h,0ebh,2,0ebh,2,0cdh,20h |
| DUMMY[16] | db 0ebh,4,0cdh,0ebh,3,0cdh,0ebh,2,0cdh,20h |

For the instruction sequence:

mov ax,bx
mov ax,cx
mov ax,dx, a pseudo random number sequence 40, 12, 49, 32 is generated by initializing a pseudo random number generator (PNRG) with the seed. As previously described, branches to the following instruction are inserted after each instruction, and a dummy opcode is inserted between each branch and the instruction that immediately follows it. Thus, the following instruction sequence results:

mov ax,bx
jump xx1
<--------
XX1:
mov ax,cx
jump XX2
<--------
XX2:
mov ax,dx
jump XX3
<--------
XX3:

where <-------- represents the point of insertion for a dummy opcode. However, the branch does not necessarily have to redirect the flow of execution to the next instruction immediately following the first instruction. Dummy opcodes are extracted from the LUT in a manner specified by the random number sequence. For example: Table 1 contains an array of 17 dummy opcodes. Using the random number sequence, the following calculations may be made:

DUMMY[40 mod17]=DUMMY[6]=db 0ebh,3,0cdh,20h, 0eah

DUMMY[12 mod17]=DUMMY[12]=db 0ebh,3,0cdh, 20h,0ebh

DUMMY[49 mod17]=DUMMY[15]=
db 0ebh,4,0cdh,20h,0ebh,2,0ebh,2,0cd.

Thus the resulting instruction sequence is:

mov ax,bx
jump XX1
db 0ebh,3,0cdh,20h,0eah
XX1:
mov ax,cx
jump XX2
db 0ebh,3,0cdh,20h,0ebh
XX2:
mov ax,dx
jump XX3
db 0ebh,4,0cdh,20h,0ebh,2,0ebh,2,0cd
XX3:

The above description is exemplary only, and not intended to be limiting. In actual practice, the random number sequence will be of varying length, and the algorithm for selecting the dummy opcodes may vary. Alternative methods of selecting dummy opcodes consistent with the spirit and scope of the invention will be apparent to those skilled in the art of computer programming. Furthermore, although the example shows an instruction sequence that had already been modified according to the previously described procedures, the opcode insertion procedure could as well be applied to unmodified instruction sequences.

Although the invention is described herein with reference to a preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for generating multiple copies of an executable software object wherein each of said copies is functionally identical to the remaining copies while being structurally unique, comprising the steps of:

providing source code for said executable object, wherein said code is any of high-level code and assembly code;

optionally, translating high-level code to assembly code;

providing a seed and a set of preferences, said seed and preferences specifying parameters for modifying said source code, wherein a separate set of preferences is provided for each version of said object;

modifying said source code according to said seed and preferences;

translating said modified source code into object code; and constructing said executable software object from said object code.

2. The method of claim 1, wherein a separate seed is generated for each version of said object.

3. The method of claim 2, wherein at least one default set of preferences is provided.

4. The method of claim 2 wherein said modifying step comprises the steps of:

selecting at least two procedures from said assembly code;

blending said procedures, wherein a single, blended procedure is formed from said selected procedures;

shuffling instructions within one or more procedures so that said instructions are reordered, while order of execution is conserved; and inserting dummy opcodes into one or more procedures.

5. The method of claim 4, wherein said shuffling step comprises the steps of:

altering the order of instructions in a procedure, wherein the procedure to be shuffled is specified by said preferences and a disorder criterion is given by said seed; and appending branching instructions so that the order of execution is conserved.

6. The method of claim 5, wherein one or more blended procedures are selected to be shuffled.

7. The method of claim 4, wherein said inserting step comprises the steps of:

after every instruction in a procedure, inserting a branch to a subsequent instruction; and inserting dummy data between the branch and the subsequent instruction, so that program flow skips over said dummy data.

8. The method of claim 7, wherein one or more shuffled procedures are selected for insertion of dummy opcodes.

9. The method of claim 4, wherein generation of said dummy opcodes is driven by a random number generator initialized by said seed.

10. The method of claim 4, wherein said dummy opcodes are selected from a plurality of predefined dummy opcodes stored in a lookup table.

11. A method of modifying the source code for a software object, wherein each copy of a resulting executable object is structurally unique while being functionally identical to all other copies, and wherein said source code is any of high-level code and assembly code, comprising the steps of:

optionally, translating said high-level code to assembly code;

providing a seed and a set of preferences, wherein a separate set of preferences is provided for each version of said object, said seed and preferences specifying parameters for modifying said source code;

blending at least two procedures from said source code, so that a single procedure is formed from said at least two procedures shuffling instructions within one or more procedures so that said instructions are reordered, while order of execution is conserved; and inserting dummy opcodes into one or more pyrocedures.

12. The method of claim 11, wherein a separate seed is generated for each version of said object.

13. The method of claim 11, wherein at least one default set of preferences is provided.

14. The method of claim 11, wherein said shuffling step comprises the steps of:

altering the order of instructions in a procedure, wherein the procedure to be shuffled is specified by said preferences and a disorder criterion is given by said seed; and appending branching instructions so that the order of execution is conserved.

15. The method of claim 11, wherein one or more blended procedures are selected to be shuffled.

16. The method of claim 11, wherein said inserting step comprises the steps of:
   after every instruction in a procedure, inserting a branch to the following instruction; and
   inserting dummy data between the branch and the next instruction, so that program flow skips over said dummy data.

17. The method of claim 11, wherein one or more shuffled procedures are selected for insertion of dummy opcodes.

18. The method of claim 11, wherein generation of said dummy opcodes is driven by a random number generator initialized by said seed.

19. The method of claim 11, wherein said dummy opcodes are selected from a plurality of predefined dummy opcodes stored in a lookup table.

20. A polymorphic code generator for modifying the source code for an executable object, wherein each version of said executable object is structurally unique while being functionally identical to all other copies, and wherein said source code is any of high-level code and assembly code, comprising:
   optionally, means for translating said high-level code to assembly code;
   means for providing a seed and a set of preferences, wherein a separate set of preferences is provided for each version of said object, said seed and preferences specifying parameters for modifying said source code;
   a procedure blender, wherein at least two procedures from said source code are blended, so that a single procedure is formed from said at least two procedures;
   a shuffler, wherein instructions within one or more procedures are shuffled so that said instructions are reordered, while order of execution is conserved; and
   a dummy opcode inserter, wherein dummy opcodes are inserted into one or more procedures.

21. The polymorphic code generator of claim 20, wherein said procedure blender, said shuffler, and said dummy opcode inserter each comprise a procedure within an executable software object.

22. The polymorphic code generator of claim 20, wherein said procedure blender, said shuffler, and said dummy opcode inserter each comprise an executable software object.

23. The polymorphic code generator of claim 20, wherein a separate seed is generated for each version of said object.

24. The polymorphic code generator of claim 20, wherein at least one default set of preferences is provided.

25. The polymorphic code generator of claim 20, wherein said shuffler comprises:
   means for altering the order of instructions in a procedure, wherein the procedure to be shuffled is specified by said preferences and a disorder criterion is given by said seed; and
   means for appending branching instructions so that the order of execution is conserved.

26. The polymorphic code generator of claim 20, wherein one or more blended procedures are selected to be shuffled.

27. The polymorphic code generator of claim 20, wherein said dummy opcode inserter comprises:
   means for inserting a branch to a following instruction after every instruction in a procedure; and
   means for inserting dummy data between the branch and the next instruction, so that program flow skips over said dummy data.

28. The polymorphic code generator of claim 20, wherein one or more shuffled procedures are selected for insertion of dummy opcodes.

29. The polymorphic code generator of claim 20, wherein generation of said dummy opcodes is driven by a random number generator initialized by said seed.

30. The polymorphic code generator of claim 20, wherein said dummy opcodes are selected from a plurality of predefined dummy opcodes stored in a lookup table.

31. A computer program product for generating multiple copies of an executable software object wherein each of said copies is functionally identical to the remaining copies while being structurally unique, said computer program product comprising a computer usable storage medium having computer readable program code means embodied in the medium, the computer code means comprising:
   computer readable program code means for:
      providing source code for said executable object, wherein said code is any of high-level code and assembly code;
      translating high-level code to assembly code;
      providing a seed and a set of preferences, wherein a separate set of preferences is provided for each version of said object, said seed and preferences specifying parameters for modifying said source code;
      modifying said source code according to said seed and preferences;
      translating said modified source code into object code; and
      constructing said executable software object from said object code.

32. The computer program product of claim 31, further comprising computer readable program code means for generating a separate seed for each version of said object.

33. The computer program product of claim 31, further comprising computer readable program code means for providing at least one default set of preferences.

34. The computer program product of claim 31, wherein said computer readable program code means for modifying said source code further comprises computer readable program code means for:
   selecting at least two procedures from said assembly code;
   blending said procedures, wherein a single, blended procedure is formed from said selected procedures;
   shuffling instructions within one or more procedures so that said instructions are reordered, while order of execution of is conserved; and
   inserting dummy opcodes into one or more procedures.

35. The computer program product of claim 34, wherein said computer readable program code means for shuffling instructions within one or more procedures further comprises computer readable code means for:
   altering the order of instructions in a procedure, wherein the procedure to be shuffled is specified by said preferences and a disorder criterion is given by said seed; and
   appending branching instructions so that the order of execution is conserved.

36. The computer program product of claim 35, wherein one or more blended procedures are selected to be shuffled.

37. The computer program product of claim 34, wherein said computer readable program code means for shuffling instructions within one or more procedures further comprises computer readable code means for inserting dummy opcodes into one or more procedures further comprises computer readable program code means for:

after every instruction in a procedure, inserting a branch to the following instruction; and inserting dummy data between the branch and the next instruction, so that program flow skips over said dummy data.

38. The computer program product of claim 34, wherein one or more shuffled procedures are selected for insertion of dummy opcodes.

39. The computer program product of claim 34, wherein generation of said dummy opcodes is driven by a random number generator initialized by said seed.

40. The computer program product of claim 34, wherein said dummy opcodes are selected from a plurality of pre-defined dummy opcodes stored in a lookup table.

41. A software package comprising:

one or more executable software objects comprising computer readable code embodied on a tangible medium, wherein a copy of at least one of said executable software objects is functionally identical to all other copies of said at least one executable software object and structurally unique, code for each version of said at least one executable software object being modified according to parameters specified by a seed and a separate set of preferences.

42. An executable software object comprising computer readable code embodied on a tangible medium wherein a copy of said executable software objects is functionally identical to all other copies of said executable software object and structurally unique, code for each version of said executable software object being modified according to parameters specified by a seed and a separate set of preferences.

* * * * *